2 Sheets. Sheet. 1.

W. E. Crandall,

Hobby Horse.

No. 100,121. Patented Feb. 22. 1870.

Witnesses.
Joshua Monroe
W. H. Finckel

Inventor.
W. E. Crandall
b. John A. Niederstein
Atty.

W. E. Crandall,
Hobby Horse.

No. 100,121. Patented Feb. 22, 1870.

Witnesses.
Joshua Monroe

Inventor.
W. E. Crandall

United States Patent Office.

WILLIAM E. CRANDALL, OF NEW YORK, N. Y.

Letters Patent No. 100,121, dated February 22, 1870.

IMPROVEMENT IN CHILDREN'S CARRIAGES.

The Schedule referred to in these Letters Patent and making part of the same.

*To all whom it may concern:*

Be it known that I, WILLIAM E. CRANDALL, of the city, county, and State of New York, have invented a new and useful Improvement in Children's Carriages and Rocking-Horses; and I do hereby declare the following to be a clear and exact description of the nature thereof, sufficient to enable others skilled in the art to which my invention appertains to fully understand and use the same, reference being had to the accompanying drawings making part of this specification, in which—

Similar letters of reference indicate corresponding parts in the several figures.

Figure 1:
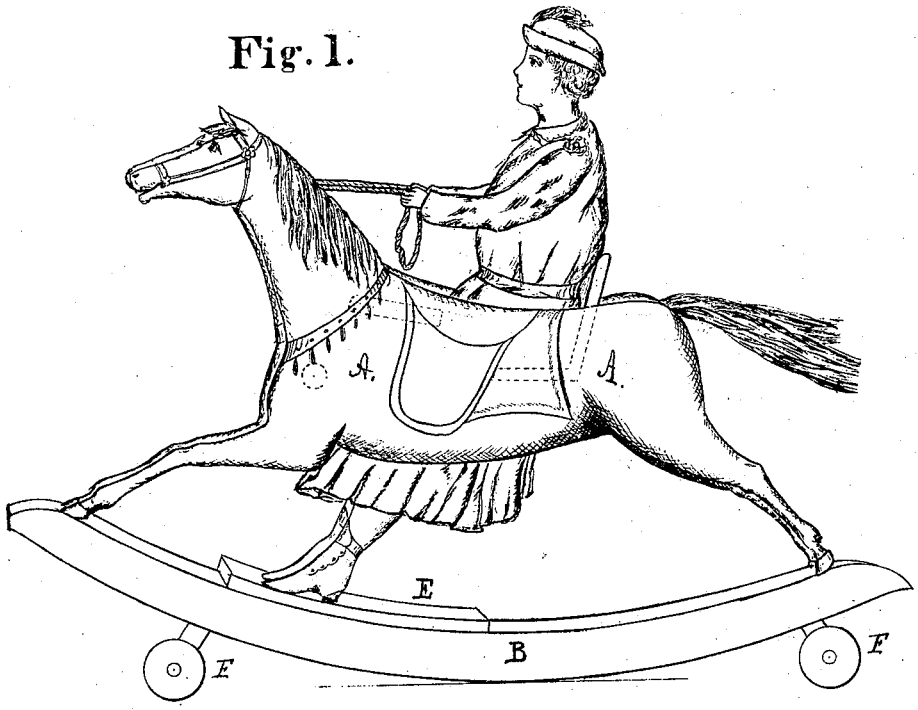
Figure 1 is a side view of the device illustrating my invention.
Figure 2:
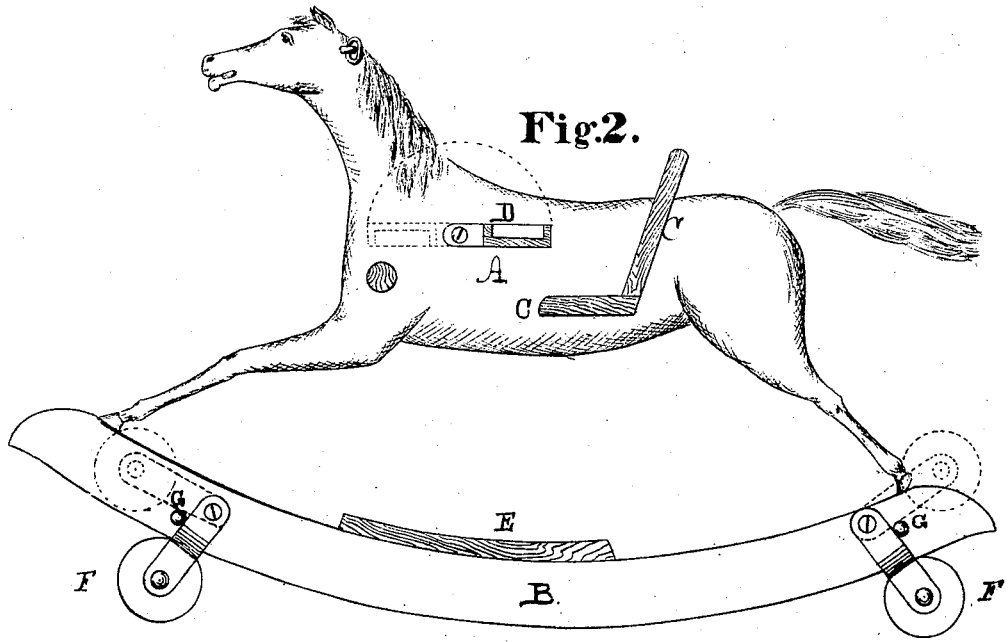
Figure 2 is a central vertical longitudinal section thereof.
Figure 3:
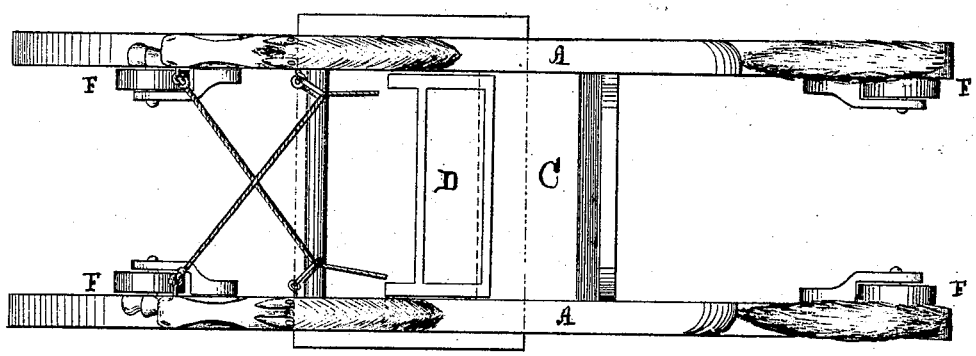
Figure 3 is a top or plan view.

My invention consists in constructing the body of a child's carriage of two frames, which are connected together so as to form a seat between them.

It also consists in a toy-box which is connected to the frames and serves to keep the rider in the seat, but it may be readily moved over in order to release him when desired.

The body may be mounted on wheels or rockers, and thus form a carriage or rocking-horse at the pleasure of the child.

In the drawings—

A A may represent two frames, which in the present case are made, in the form of horses, which are arranged parallel to each other with their feet resting on a base, B, which, if desired, may be in the form of rockers of an ordinary rocking-horse.

The frames are connected together by cross-pieces C, which, with the former, constitute a guarded seat, so that a child can readily ride without danger of being thrown or falling out.

In order to render his position still more secure, there is connected to the frames in front of the seat a box, D, which in one position holds the child in the seat, and likewise forms a receptacle for his playthings, and in the other position allows the child to remove himself or be removed from the seat.

The base B and frames respectively may be connected together by auxiliary cross-rods, bars, or braces, or otherwise, for strengthening purposes, and the child may rest his feet on a foot-board, E, which is secured to the base B.

To the base B there is connected, in any suitable manner, a series of wheels, F, whose bearings should be so constructed that the wheels may be swung or raised up or down, whereby the whole weight may rest either on the wheels or on the bed.

When it is desired to employ the device as a carriage, the wheels are swung or moved downward, and, by means of suitable pins, G, or other retaining devices, the bed is cleared from the floor, and the carriage can then be drawn forward as an ordinary child's carriage.

When the wheels are raised or removed, then the bed should consist of rockers, so that the child can rock himself, after the manner of a rocking-horse.

Should the arms or shafts of the wheels be immovable fixtures, the bed E may consist of a flat board or strip, and not be in the form of rockers.

It will be perceived that the construction of the body A C not only produces a convenient and safe seat for the child, but that the appearance is presented of two horses which the child can drive simultaneously without straddling either, and thus be protected from falling off.

Suitable harness may be placed on the horses and the bridle extend within convenient reach of the child.

It is noticeable that the child can neither fall forward, backward, or sideward, and I thus produce an attractive, amusing and safe riding medium.

Having thus described my invention,

What I claim as new, and desire to secure by Letters Patent, is—

1. The frames A, connected together by a seat, C, forming the body of a riding device and allowing the feet to project through it, when combined and operating substantially as described.

2. The box D, connected to the frames A, in combination with the seat C, substantially as and for the purpose described.

3. The wheels F or rockers B, in combination with body and seat A C, substantially as and for the purpose described.

4. The frames A, seat C, box D, bed B, and wheels G, combined and operating together, substantially as described.

The above signed by me this 10th day of January, 1870.

WM. E. CRANDALL.

Witnesses:
 PETER COUTANT,
 B. B. CHAPPELL.